United States Patent
Chen

(10) Patent No.: US 11,347,764 B1
(45) Date of Patent: May 31, 2022

(54) TIME SERIES TABLE COMPRESSION

(71) Applicant: Teradata US, Inc., Dayton, OH (US)

(72) Inventor: Haiyan Chen, Bellevue, WA (US)

(73) Assignee: Teradata US, Inc., San Diego, CA (US)

( * ) Notice: Subject to any disclaimer, the term of this patent is extended or adjusted under 35 U.S.C. 154(b) by 91 days.

(21) Appl. No.: 15/860,491

(22) Filed: Jan. 2, 2018

Related U.S. Application Data

(60) Provisional application No. 62/441,268, filed on Dec. 31, 2016.

(51) Int. Cl.
*G06F 16/25* (2019.01)
*G06F 16/22* (2019.01)
*G06F 16/23* (2019.01)

(52) U.S. Cl.
CPC ........ *G06F 16/258* (2019.01); *G06F 16/2282* (2019.01); *G06F 16/2291* (2019.01); *G06F 16/2379* (2019.01)

(58) Field of Classification Search
CPC ............................ G06F 16/1744; G06F 16/221
USPC .......................................................... 707/693
See application file for complete search history.

(56) References Cited

U.S. PATENT DOCUMENTS

| | | | | |
|---|---|---|---|---|
| 7,103,608 B1* | 9/2006 | Ozbutun | ........... | G06F 16/24557 707/604 |
| 2012/0082232 A1* | 4/2012 | Sole Rojals | ......... | H04N 19/176 375/240.18 |
| 2012/0130963 A1* | 5/2012 | Luo | ..................... | G06F 16/2443 707/693 |
| 2014/0176571 A1* | 6/2014 | Singh | ....................... | G06T 1/20 345/501 |
| 2014/0344511 A1* | 11/2014 | Kim | ..................... | G06F 11/0778 711/105 |
| 2015/0220080 A1* | 8/2015 | Nixon | ................... | G05B 19/418 700/19 |
| 2015/0379054 A1* | 12/2015 | Kernert | ................. | G06F 16/221 707/625 |
| 2017/0116237 A1* | 4/2017 | Zhang | ................... | G06F 16/278 |

* cited by examiner

*Primary Examiner* — Hung T Vy
(74) *Attorney, Agent, or Firm* — Randy L. Campbell, Jr.

(57) ABSTRACT

A data store system includes a storage device and a processor in communication with the storage device. The processor may receive data from a source and generate a plurality of rows from the data. The processor may further apply row reduction criteria to the buffered plurality of rows. The processor may further, in response to application of the row reduction criteria, determine at least one resultant row. A number of the at least one resultant row is less than a number of the plurality of rows. The processor may further store the at least one resultant row in the storage device. A method and computer-readable medium is also disclosed.

18 Claims, 7 Drawing Sheets

FIG. 4

| TIME | TEST_ID | S_NUM | TEMP | HUMID | TD T | TD 2 |
|---|---|---|---|---|---|---|
| 12:00:00 | 1 | 1 | 60 | 70 | N/A | N/A |
| 12:00:05 | 1 | 1 | 60 | 70 | 0 | 0 |
| 12:00:10 | 1 | 1 | 60 | 70 | 0 | 0 |
| 12:00:15 | 1 | 1 | 60 | 70 | 0 | 0 |
| 12:00:20 | 1 | 1 | 60 | 70 | 0 | 0 |
| 12:00:25 | 1 | 1 | 60 | 70 | 0 | 0 |
| 12:00:30 | 1 | 1 | 60 | 70 | 0 | 0 |
| ... | ... | ... | ... | ... | ... | ... |
| 12:55:50 | 1 | 1 | 60 | 70 | 0 | 0 |
| 12:55:55 | 1 | 1 | 72 | 73 | 0 | 0 |

| TIME | S_NUM | TEMP | HUMID |
|---|---|---|---|
| 12:00:00 | 1 | 60 | 70 |
| 12:55:55 | 1 | 60 | 70 |

400

402

TIME SERIES TABLE COMPRESSION

CLAIM OF PRIORITY

This application claims the benefit of priority under 35 U.S.C. § 119(e) of U.S. Provisional Patent Application Ser. No. 62/441,268 filed on Dec. 31, 2016, which is hereby incorporated by reference herein in its entirety.

BACKGROUND

Data streaming has become increasingly popular as more and more systems achieve this capability. However, this increases the amount of data to be monitored and maintained. In many data stream systems, there is a constant flow of data such as sensor monitoring systems. While the data is important, there is often massive amounts of repetitive data or a pattern of behavior of the data. In such scenarios, vast amounts of storage may be required to store this data even though the data could possibly be condensed because of the repetitive or patterned behavior. Thus, it is desirable to reduce the storage amount of data associated with data stream content, while maintaining the integrity of the data itself.

SUMMARY

According to one aspect of the disclosure, a data store system includes a storage device and a processor in communication with the storage device. The processor may receive data from a source and generate a plurality of rows from the data. The processor may further apply row reduction criteria to the buffered plurality of rows. The processor may further, in response to application of the row reduction criteria, determine at least one resultant row. A number of the at least one resultant row is less than a number of the plurality of rows. The processor may further store the at least one resultant row in the storage device.

According to another aspect of the disclosure, a method may include receiving, with a processor, data from a source. The method may further include generating, with the processor, a plurality of rows from the data. The method may further include applying, with the processor, row reduction criteria to the buffered plurality of rows. The method may further include, in response to application of the row reduction criteria, determining, with the processor, at least one resultant row. A number of the at least one resultant row is less than a number of the plurality of rows. The method may further include storing, with the processor, the at least one resultant row in the storage device.

According to another aspect of the disclosure, a non-transitory computer-readable medium may be encoded with a plurality of instructions executable by a processor. The plurality of instructions may include instructions to receive data from a source. The plurality of instructions may further include instructions to generate a plurality of rows from the data. The plurality of instructions may further include instructions to apply row reduction criteria to the buffered plurality of rows. The plurality of instructions may further include instructions to, in response to application of the row reduction criteria, determine at least one resultant row. A number of the at least one resultant row is less than a number of the plurality of rows. The plurality of instructions further includes instructions to store the at least one resultant row in the storage device.

BRIEF DESCRIPTION OF THE DRAWINGS

The present disclosure may be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 4 is an example of compression in a time series table.

DETAILED DESCRIPTION OF THE FIGURES

Figure 1:
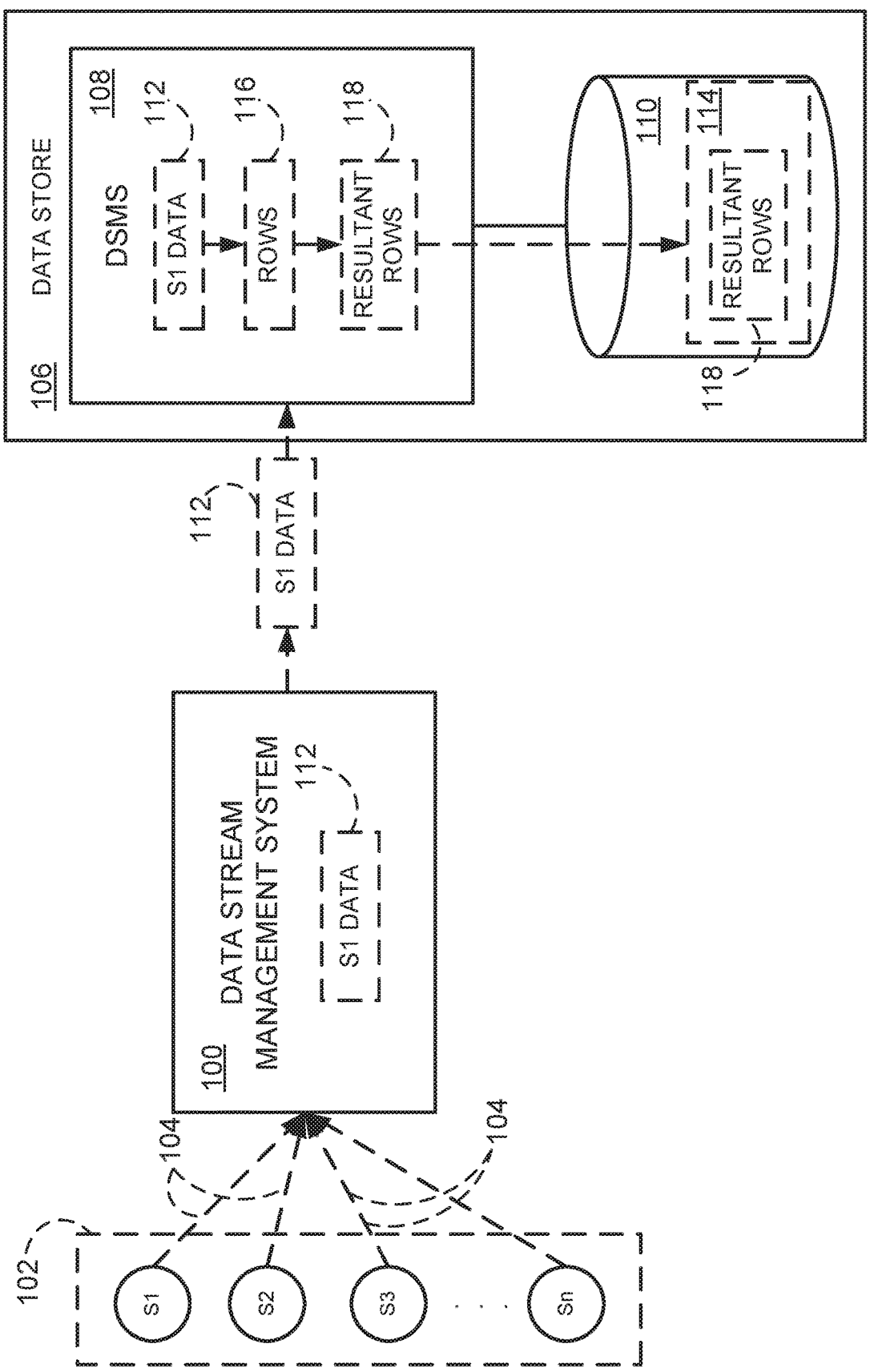
FIG. 1 is a block diagram of an example data stream management system and data store.

FIG. 1 is a conceptual diagram of a data stream management environment 100. In one example, a data stream management system 100 may receive data from various data sources 102, individually designated as S1 through Sn. The data stream management system 100 may represent one or more sub-systems that act to ingest data streams 104 and manage them so that they may be properly stored in a data store 106. The data stream management system 100 may ingest the data streams 104 at the rate at which the data sources 102 send the data. Upon receipt, the data stream management system 100 may identify the data source 102 of the data stream 104. The data stream management system 100 may buffer received data and provide it to the data store 106 in a particular format and at a rate that the data store 106 can handle.

In one example, the data store 106 may include a data store management system (DSMS) 108 and data storage facilities 110. The DSMS 108 may process and manage received data to be stored in the data storage facilities 110. In one example, the DSMS 108 may process the received data into data table format, such as in a relational database, for example. The data stream management system 100 may identify the data source 102 of the data included in a data stream 104. The data stream management system 100 may provide the identified data to the DSMS 108 for additional processing and/or storage.

In one example, the DSMS 108 may store data in data tables. As data from the data streams 104 is received by the data stream management system 100 and provided to the DSMS 108, the DSMS 108 may organize the received data into table rows to be stored in one or more data tables. Streaming data sources, such as the data sources 102 may continuously send streaming data to the data stream management system 100. This may result in large amounts of data to be stored in table format in the DSMS 108. In one example, a "time series table" may be created in the DSMS 108 that allows fewer rows of a data table be stored while maintaining the integrity of the data. Thus, the data table may be "compressed" in that less rows of data collected for the time series table may be stored than are collected. This compression may be based on time considerations, pattern recognition of data, or value aggregation of data. Creation of the time series table enables the DSMS 108 to recognize specific characteristics and abilities of the time series table.

In one example, S1 data 112 from data source S1 may be received by the data stream management system 100, which may represent a number of rows associated with a time series table 114. In one example, the DSMS 108 may receive the S1 data 112. The DSMS 108 may generate rows 116 from the S1 data 112. The DSMS 108 may then determine if compression is to be applied to the rows 116. If compression is applied, resultant rows 118 of the compression performed may be stored in the time series table 114. If compression is not applied, the resultant rows 118 may include all of the rows 116.

In other examples, the compression of time series table rows may be performed prior to being received by the DSMS 108. In one example, the data stream management system 100 may handle the compression and deliver the resultant rows 118 to the DSMS 108. In yet another example, the time series table rows 116 may be created and compressed at the data sources 102 in scenarios in which the data sources 102 can handle the compression logic. The resultant rows 118 may then be sent in the data streams 104 to the data stream management system 100 and on to the DSMS 108. Other examples may include compression being done in any combination of the data sources 102, the data stream management system 100, and the DSMS 108.

In one example, the syntax for creating a time series table may include additional properties designed for optimally processing and storing stream data:

CREATE TIME SERIES TABLE name
    [RETENTION PERIOD n {HOUR|DAY|MONTH|YEAR}
    [AGED DATA VISIBLE]
    INTERVAL m {SECOND|MINUTE|HOUR|DAY|MONTH|YEAR}
    COMPRESS BY {
      HOUR|MONTH|YEAR
      |HISTOGRAM
      |TIME DERIVATIVE
      |UDF
    [ON COLUMN expression]|[<condition><threshold>]}
(column_definitions) index_definition In this example, the expression "CREATE TIME SERIES TABLE creates the time series table with "name" indicating the actual name of the time series table. The "Retention Period" feature defines the data retention policy, which allows a time period to be selected in which data is held in the time series table with n being the magnitude of a selected time unit in the time series table. Data stored in the time series table may be deleted according to the retention policy. The retention period can be used to indicate that aged data is invisible to a user even before the aged data is cleaned up per maintenance schedule of the retention policy managed by the DSMS 108. The retention period can also be used to safe guard the data for data retention law compliance by preventing accidental data deletion. The maintenance schedule may be defined out of the table definition, considering that the maintenance schedule does not affect the results of a user query and a query planner can effectively exclude the partitions containing aged data, if the time series table incorporates row partition mechanisms or zone map mechanisms depending on the data store configuration. In one example, the retention period may be selected to be an hour, day, month, or year with n being the magnitude of the selected time period unit. At the starting point of the selected retention time unit, the rows out of the retention period are deleted. For example, the retention period may be set at six months, which retains rows of a time series table for 6 months before deletion. The "Aged Data Visible" allows the data outside the retention period to be visible to a user. If the feature is not included, data outside the retention policy is unable to be seen by a user.

The "Interval" feature allows the time series table to determine when input is to be received for the table. For example, if sensor data is being used to populate the time series table, the interval setting determines the increment between each sensor reading received by the data table. In one example, the interval expression may use seconds, minutes, and hours as possible time units. The "Compress By" feature allows data in the time series table to be compressed through various manners. The time series table may implement time-based compression. In one example, the time series table may compress column values through aggregation on the rows of the specified time period. For example, if the "Compress By" feature is set to "hour", the time series table may aggregate values of one or more selected columns of the time series table over each hour of collected data. The time series table may implement time derivative compression on a column, which allows the removal of rows that have a linear pattern or constant pattern with only the first and last rows of the pattern stored in order to interpolate a value if needed later. The time series table may implement more sophisticated time derivative compression on an expression that using column values of the time series table. For example, the "[<condition><threshold>]" feature allows a condition to be placed on the compression and a threshold value.

The time series table may also implement histogram and user defined function (UDF) based compression. Histogram-based compression may allow a value profile to be applied against a column of a database table. UDF-based compression may allow a UDF to be applied to one or more columns of the time series table that identifies a particular pattern or other predetermined behavior. For instance, a user may implement the time derivative based compression for driver telematics data using a UDF on a geometry column as in a geospatial table. If the UDF is declared as "boolean AccelarationCheckOK(geometry geo_point1, geometry geo_point2, geometry geo_point3, timestamp time)", a user may implement a complex arithmetic model on acceleration check using speed limit, weather, or other factors.

The "On Column" feature identifies which columns and/or expressions to which the compression criteria is to be applied. The time series table may allow the compression to be applied to one or more columns of the time series table independently and may also allow the use of expressions that include column values to be used as compression criteria as well. The "(column_definitions) index_definition" represent the columns created in the time series table as well as the index to be used.

The time series table may include various characteristics automatically upon creation. In one example, the time series table may internally reserve columns for time and a time derivative. The time series table may be append-only. The time series table can be amendable, with extra steps to guarantee the integrity of the rows. For instance, if updating a compressed row causes the compression inapplicable, then the affected section needs to be decompressed.

In one example, data 200 from a data source 102 (not shown) may be used to populate a time series table 202 being stored in the DSFs 112 received by the data stream management system 100. The data stream management system 100 may receive the data 200 and pre-process it to be identified by the DSMS 108 upon receipt. The data 200 may represent data to populate one or more rows of the time series table 202.

The time series table associated with the data 200 may have previously been created. Thus, the DSMS 108 may recognize the pre-processed row data 204 as belonging to the time series table 202. The DSMS 108 may create one or more rows 206 of the time series table initially based on the contents of the pre-processed data 204. The DSMS 108 may buffer the rows 206 initially in a buffer 208. In one example, the maximum number of buffered rows 206 may be a user-configurable parameter of the DSMS 108. In other examples, the number of buffered rows 206 to be held in the buffer 208 may be dynamically selected based on system load or other criteria.

Figure 2:
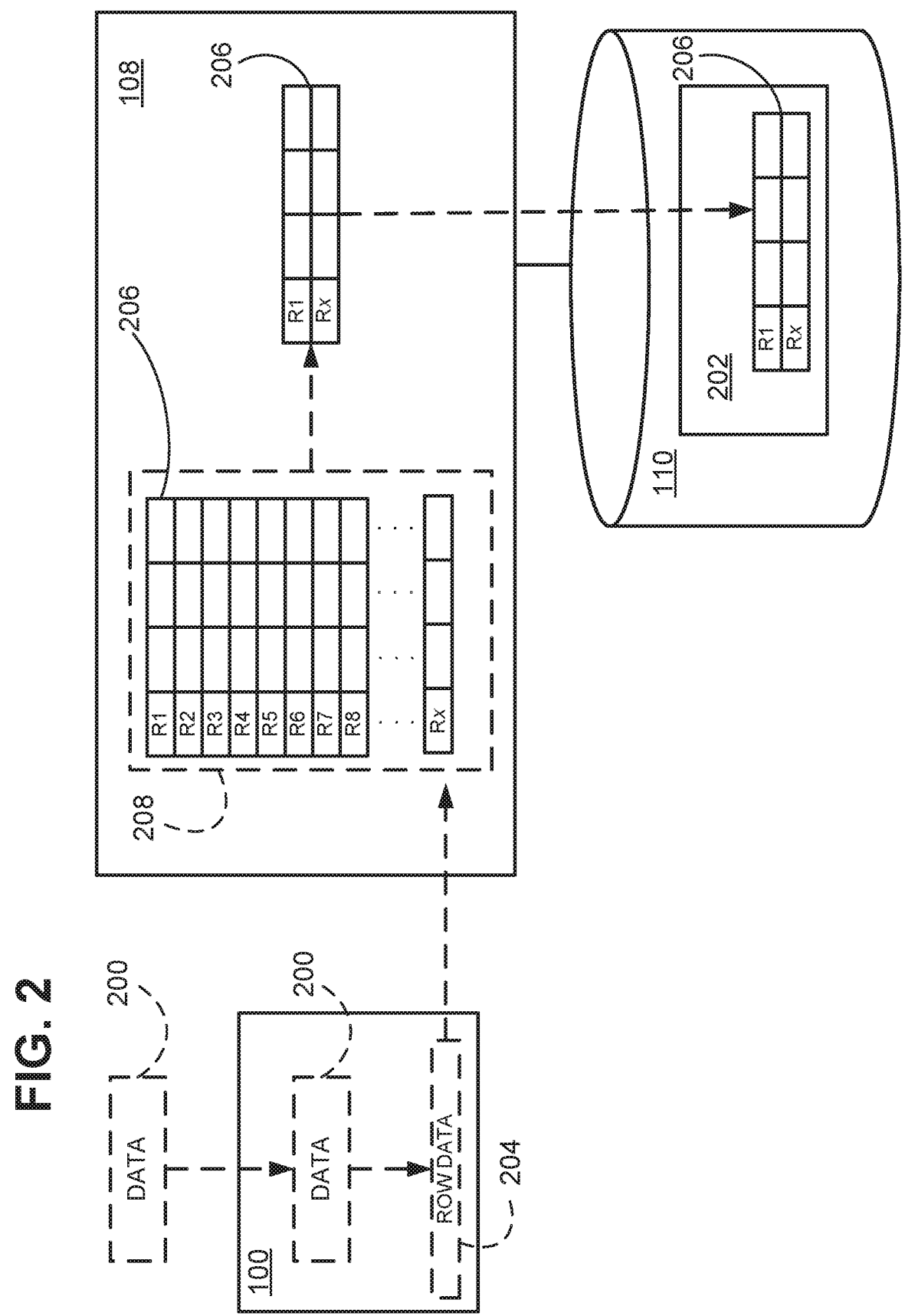
FIG. 2 is a block diagram of example compression of a time series table.

In the buffer 208, the DSMS 108 may determine if the compression conditions of the time series table are to be applied the rows 206. Inspection of the rows 206 by the DSMS 108 may be triggered based on one or more conditions, such as the buffer 208 being full or predetermined inspection times. If the compression condition is to be applied to the rows 206, the RDBMS 102 may remove rows 206 accordingly. In the example of FIG. 2, the compression condition may be applied to rows R1 through Rx. Rows R1 and Rx may be stored as endpoints with rows in between being removed. Time derivative, UDF, and histogram compression may result in endpoint rows remaining. For example, in time derivative compression, a time derivative may be determined based on one or more column values in the rows 206. If across multiple rows 206 the time derivative is zero or constant, then those rows 206 between endpoint rows R1 and Rx may be removed. The rows R1 and Rx may be stored in the time series table 202 in the DSFs 112. In histogram compression, if values of a column in the rows 206 sequence of adjacent rows match a particular sequence, those rows may be compressed to endpoint rows since the pattern is known in between the endpoint rows.

Figure 3:
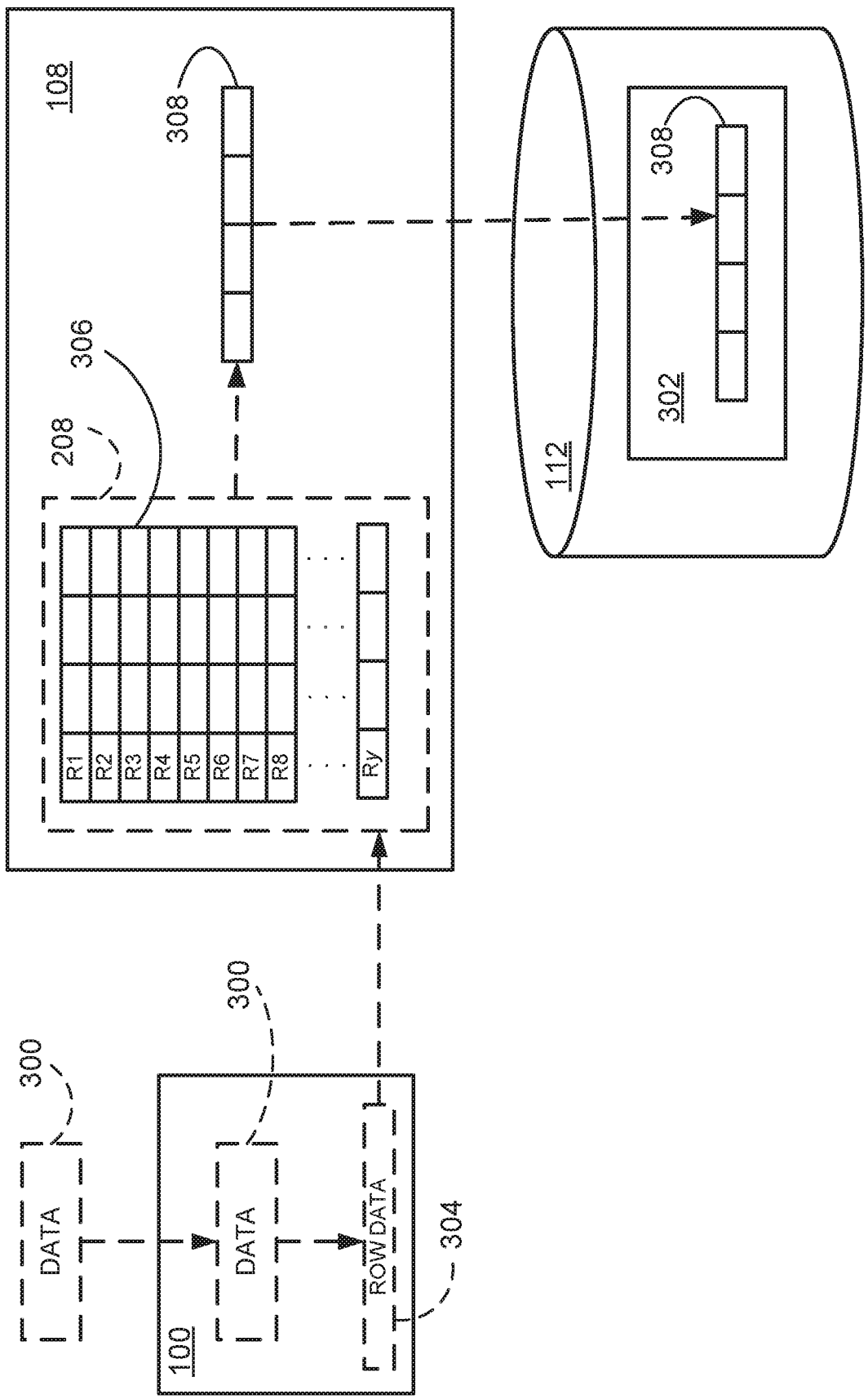
FIG. 3 is a block diagram of example compression of a time series table.

FIG. 3 is an example of time-based compression applied to the rows of a time series table 300. Similar to the example of FIG. 2, data 300 may be associated with a time series table 302 stored in the DSFs 112. The data stream management system 100 may identify the source of the data 300 and generate pre-processed row data 304 for the DSMS 108. The DSMS 108 may buffer the rows 306 in the buffer 208, which includes rows R1 through Ry. The DSMS 108 may apply a time-based compression to the rows to aggregate one or more column values to generate a new row 308, which may be stored in the time series table 302.

In the examples of FIGS. 2 and 3, the DSMS 108 is shown as taking the preprocessed row data and generating rows in the buffer 208. In other examples, the data stream management system 100 may handle row creation to be sent to the DSMS 108. In other examples, the data steam management system 100 may handle the compression so that only the rows of a time series table to be stored are transmitted to the DSMS 108. In yet other examples, the data sources 102 may handle some or all of the row creation and compression.

In one example, a time series table using time derivative compression may be created using the syntax:

CREATE TIME SERIES TABLE T_SensorData
COMPRESS BY TIME DERIVATIVE ON COLUMN temperature COLUMN humidity
INTERVAL 5 SECONDS
RETENTION PERIOD 1 YEAR
{
Time TimeStamp;
TimeDerivative float;
SensorNumber int TAG;
TestID int TAG;
Temperature float;
Humidity float;
} Primary Index (SensorNumber);

This example may be associated with a set of sensors, such as those used to monitor temperature and humidity in a system. In this example, a test identifier ("TestID") may identify a particular subsystem and a sensor number ("SensorNumber") may identify a particular sensor within a subsystem. In the time series table "T_SensorData", compression is to occur based on the temperature and humidity values in the T_SensorData table. The interval is five seconds, which indicates that data received from each sensor will be timestamped every five seconds. The retention period is one year, which indicates a new table will be created after one year's time with the previous table being discarded. The columns SensorNumber and TestID include the "TAG" feature, which indicates that T_SensorData table that the compression is only applied to the rows with the same TAG value. For instance, on the same sensor at the spot of two different subsystems, the data from the two sensors produces different TAG values (subsystem 1, sensor number 5), (subsystem 2, sensor number 5). The data from sensor number 5 of subsystem 1 is compressed independent of the data from sensor number 5 of subsystem 2.

FIG. 4 is an example of the time derivative compression applied to rows of data associated with T_SensorData table. The rows 400 may be some or all of rows held in a buffer by the DSMS 108 prior to compression. In this example, the rows make up one hour's worth of sensor data for sensor number ("S_NUM") one in the TestID=1 subsystem recorded between 12:00:00 and 12:55:55 of a given day. While not shown, the particular date may also be included with the time stamp of the "TIME" column. In this example, the temperature and humidity are constant from 12:00:00 through 12:55:50. The time derivative for the column and humidity of each row is determined from the prior row values. For example, the time derivative for the temperature ("TD T") and humidity ("TD H") of the third row is based on the temperature and humidity differences over time between the temperature and humidity values in the third row and the second row. Since the time derivative values do not change between 12:00:00 and 12:55:50, the DSMS 108 may only store the endpoint rows with the time stamp of 12:00:00 and 12:55:05, since any temperature or humidity value may be interpolated if subsequently needed. Thus, the endpoint rows 402 are those stored in the T_SensorData table.

When the T_SensorData table is a row-partitioned table, rows may be compressed only when the time derivative values of both the temperature and humidity are constant. If only one of the values is shown a non-constant change, then the entire row needs to be stored since that value cannot be interpolated. However, if T_SensorData table is stored in columnar format, the column rows of may be compressed independently of one another.

In another example, a time series table may be created using the syntax:

CREATE TIME SERIES TABLE T_TelamaticsData
COMPRESS BY TIME DERIVATIVE ON COLUMN ((x*x+y*y)^0.5) WITH DEVIATION<=0.5
INTERVAL 5 SECONDS
{
Time TimeStamp;
TimeDerivative float;
DRIVERID int TAG;
TRIPID int TAG;
x int;
y int;
} Primary Index (DRIVERID);

In this example, a time series table "T_TelematicsData" is created. The T_TelematicsData table maintains telematics data associated with vehicle drivers and particular trips taken by the drivers. The T_TelematicsData table includes a time column, which stores a time stamp, and time derivative column. The "DRIVERID" column stores an identifier for a particular driver and the "TRIPID" column stores an identifier for a particular trip associated with a driver. The "x" and "y" columns store geospatial coordinate data for each trip. The T_TelematicsData table compresses on the time derivative of the expression (x*x+y*y)^0.5, which provides acceleration. Thus, the T_TelematicsData table rows are only stored if there is a non-constant acceleration from row to row of the T_TelematicsData table. The expression "WITH DEVIATION<=0.5" allows nominal acceleration values of 0.5 or less speed units per second squared to be considered constant. This allows not only rows associated with constant acceleration values to be compressed but also those rows associated with insignificant acceleration values. Similar to the T_SensorData table, rows of data associated with the T_TelematicsData table may be buffered by the DSMS 108 and determine if compression is appropriate. If any compression is appropriate, endpoint rows may be stored in the T_TelematicsData table with the ability to "decompress" rows through interpolation to determine row values for a particular time.

Figure 5:
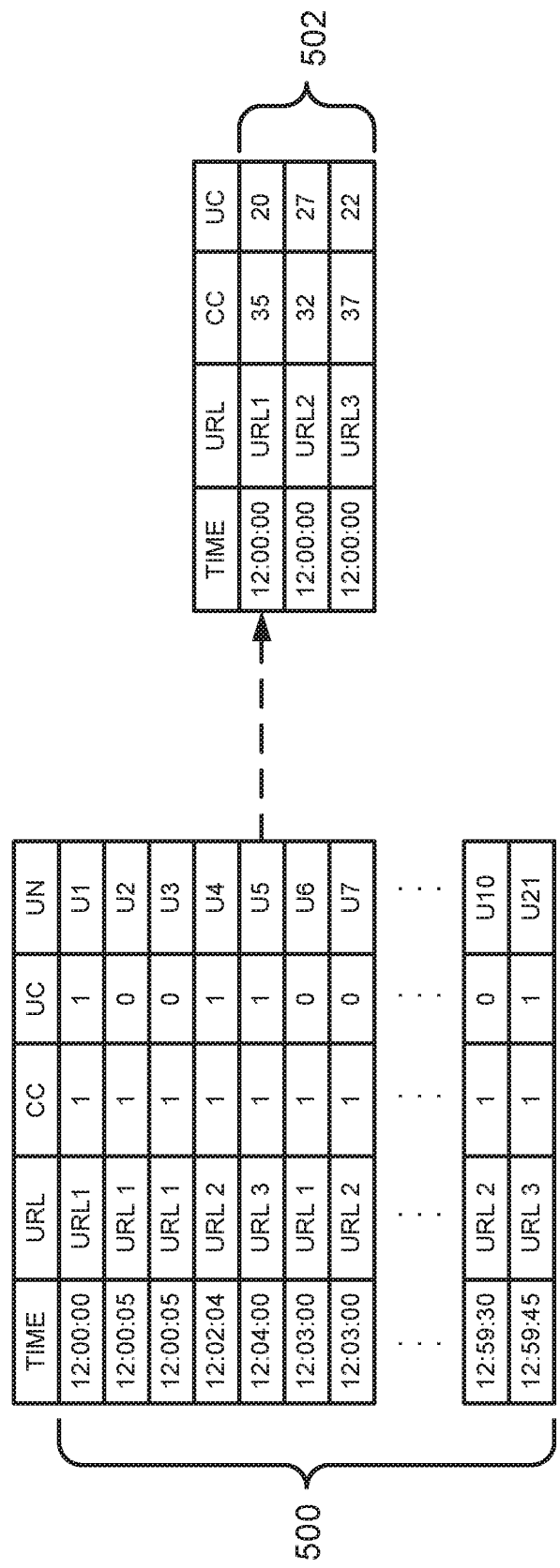
FIG. 5 is an example of compression in a time series table.

In another example, a time series table may be created using the syntax:
   CREATE TIME SERIES TABLE T_WebClickData
   COMPRESS BY DAY
   RETENTION PERIOD 1 MONTH
   {
   Time TimeStamp;
   URL VARCHAR(200) TAG;
   ClickCount double MEASUREMENT OF COUNT(*);
   UserCount double MEASUREMENT OF COUNT(DIS-
      TINCT(UserName)) APPROXIMATE BUCKET 500;
   UserName VARCHAR(200) PSUEDO TAG; --For defi-
      nition and calculation only. No storage.
   } Primary Index (URL);

In this example, a time series table "T_WebClickData" is created to collect amount of clicks a particular Uniform Resource Locator ("URL") receives and the number of different users generating the clicks. The T_WebClickData table contains a time column and a URL column to identify a URL receiving clicks. Each time a URL receives a click from a user, the time of the click, the user, and the URL may be recorded. This data may be used by the DSMS 108 to generate a row with the fields of the T_WebClickData table. Each time these values are provided to the DSMS 108, the "ClickCount" field of a row may be populated with the number of rows (Time, URL, UserName) received, as indicated by the measurement declaration of "COUNT(*)". The "UserCount" field of the row may be populated with the number of unique users as indicated by the measurement declaration of "COUNT(DISTINCT(UserName))". More specifically, the compression algorithm effectively takes the click stream data (Time, URL, UserName) and does the aggregation on the measurements, as declared by "MEASURMENT OF (aggregate_function)", using TAG fields as GROUP-BY fields for the aggregation. The effect is an aggregation on a table with rows (time, URL, UserName), called T_ClickStream, and insert the aggregation results into a table with rows time, URL, ClickCount, and UserCount for a specified time interval determined by the compression period selected. The compression process is equivalent to performing the below INSERT-INSERT statement for every day after receiving all the rows for the day:
   INSERT INTO T_WebClick AS
   SELECT URL,
   MIN(time) AS StartTime,
   COUNT(*) AS ClickCount,
   COUNT(DISTINCT username) AS UserCount
   FROM T_ClickStream
   WHERE time>=TimeStamp '2014-01-01 00:00:00' AND
      time<TimeStamp '2014-01-01 00:00:00'+INTERVAL '1'
      DAY GROUP BY URL;

FIG. 5 is an example of rows 500 being considered for compression as part of the T_WebClickData table. The rows 500 are to be aggregated over an hour (12:00:00 to 12:59:59), which provides the click count and number of unique users for each of three URLs (URL1, URL2, and URL3). The aggregated rows 502 may be stored in the time series table T_WebClickData table.

Figure 6:
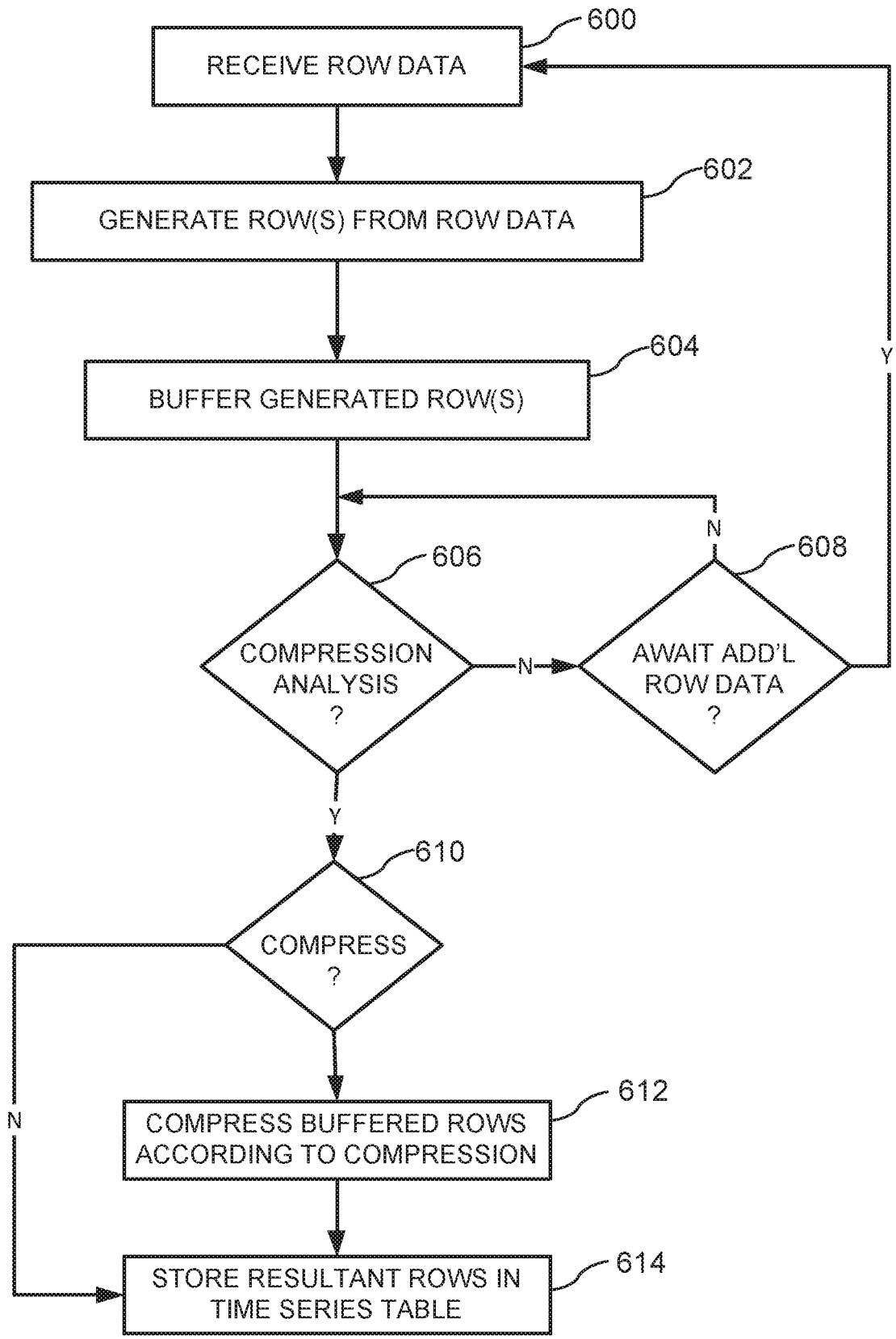
FIG. 6 is an operational flow diagram of example compression analysis of a time series table.

FIG. 6 is an operational flow diagram of example row insertion into a time series table by the DSMS 108. In one example, the DSMS 108 may receive row data (600), which may include some or all of the data to populate a row of the time series table. The DSMS 108 may generate a row from the row data received (602). In one example, structure of the rows may be based on the parameters defined in the creation of the time series table. Each generated row may be initially buffered by the DSMS 108 (604). The DSMS 108 may determine if compression analysis is to be performed (606). The criteria for performing the compression analysis may be based on one or more criteria, such as maximum number of buffered rows being reached, a predetermined amount of elapsed time, or other suitable criteria.

If compression analysis is not to be performed, the DSMS 108 may determine if additional row data is to be awaited (608). In scenarios in which the buffer 208 is to contain a certain number of rows or amount of data prior to compression analysis, the DSMS 108 may await additional row data to be received. If the compression analysis is to be performed based on an elapsed amount of time, the DSMS 108 may bypass awaiting additional rows. If the compression analysis is to be performed, the DSMS 108 may determine if the buffered rows are to be compressed based on the compression criteria associated with the time series table (610). In one example, if the compression is to be applied, the DSMS 108 may apply the compression criteria accordingly based on time series table (612). The DSMS 108 may store the resultant rows of the compression consideration (614), which may include some or all of the rows or, in the case of aggregation, one or more new rows. In one example, when data from the time series table is needed that has been compressed, such as in time derivative compression, the resultant rows from compression may be retrieved and the values needed may be found using interpolation based on the values of the resultant rows and the compression parameters.

Figure 7:
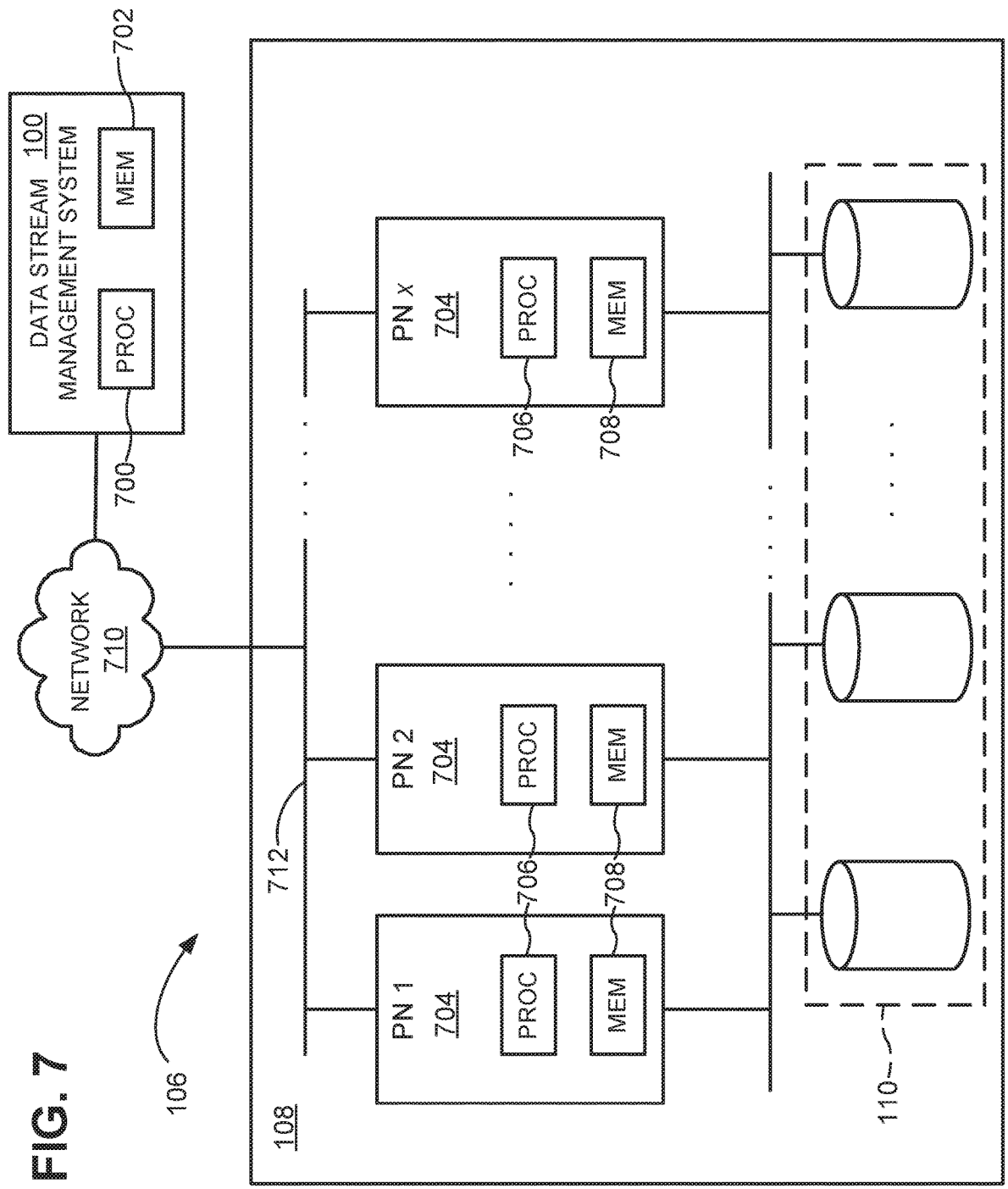
FIG. 7 is an example hardware environment of a data stream management system and data store.

FIG. 7 is a block diagram of the data stream management device 100 and the data store 106. The data stream management system 100 may include one or more processors 700 and one or more memory devices 702. Memory 702 may include one or more memories and may be computer-readable storage media or memories, such as a cache, buffer, RAM, removable media, hard drive, flash drive or other computer-readable storage media. Computer-readable storage media may include various types of volatile and non-volatile storage media. Various processing techniques may be implemented by the processors 700 such as multiprocessing, multitasking, parallel processing and the like, for example. Each of the processors 700 may represent one or more physical and/or execute one or more virtual processors.

In one example, the DSMS 108 may employ a parallel processing system that includes an array of x processing nodes 704. Each processing node 704 may include one or more processors 706 and one or more memory devices 708. The array of processing nodes 704 may operate in parallel with one another, such as in a massively parallel processing ("MPP") system for example. The data store 106 may also include the DSFs 110. The DSFs 110 may represent one or more storage and/or memory devices capable of persistent storage. During operation, the time series tables may be stored across multiple DSFs 110. In one example, each processor 706 may access an exclusive portion of the DSFs 110. In other examples, the processors 706 may commonly access the DSFs 110.

During operation, the data stream management system 100 may communicate with the data store 106 via a network 710. The network 710 may be wired, wireless, or some combination thereof. The network 710 may be a virtual private network, web-based, directly-connected, or some other suitable network configuration.

An interconnection 712 allows communication to occur within and between each processing node 704. For example, implementation of the interconnection 712 provides media within and between each processing node 704 allowing communication among the various processing units. Such communication among the processing units may include communication between processors 706, including virtual processors, with the same or different processing nodes 704. The interconnection 712 may be hardware, software, or some combination thereof. In instances of at least a partial-hardware implementation the interconnection 712, the hardware may exist separately from any hardware (e.g., processors, memory, physical wires, etc.) included in the processing nodes 304 or may use hardware common to the processing nodes 704. In instances of at least a partial-software implementation of the interconnection 712, the software may be stored and executed on one or more of the memories 708 and processors 706 of the processor nodes 704 or may be stored and executed on separate memories and processors that are in communication with the processor nodes 704. In one example, interconnection 712 may include multi-channel media such that if one channel ceases to properly function, another channel may be used. Additionally, or alternatively, more than one channel may also allow distributed communication to reduce the possibility of an undesired level of communication congestion among processing nodes 704.

All examples herein are applicable to various types of data stores, such as relational databases, file systems or other data stores suitable for structuring, organizing, and processing data. While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A data store system comprising:
    a storage device;
    a processor in communication with the storage device, the processor configured to:
    receive data from a source;
    generate a plurality of rows from the data;
    buffer the plurality of rows;
    apply row reduction criteria to the buffered plurality of rows, wherein the row reduction criteria comprises at least one condition associated with content of the buffered plurality of rows;
    in response to application of the row reduction criteria, determine at least one resultant row based on presence of the at least one condition, wherein a number of the at least one resultant row is less than a number of the buffered plurality of rows, and the at least one resultant row is configured to reconstruct the plurality of rows; and
    store the at least one resultant row in the storage device.

2. The data store system of claim 1, wherein the row reduction criteria comprises determination of a plurality of time derivative values, wherein each time derivative value is based on adjacent column values of at least one column of the buffered plurality of rows, wherein the processor is further configured to:
    identify a subset of the buffered plurality of rows, wherein the subset of the buffered plurality of rows are associated with a time derivative value below a predetermined value; and
    select a first and last row of the subset of the buffered plurality of rows to be included in the at least one resultant row, wherein other rows of the subset of the buffered plurality of rows are not included in the at least one resultant row.

3. The data store system of claim 1, wherein the row reduction criteria comprises aggregation of row values in at least one column over a predetermined time window, wherein the processor is further configured to aggregate rows values of the at least one column in the buffered plurality of rows to create at least one new row.

4. The data store system of claim 1, wherein the row reduction criteria is application of a user-defined function.

5. The data store system of claim 1, wherein the row reduction criteria is a value profile, wherein the processor is further configured to identify a value profile of consecutive values in at least one column of the buffered plurality of rows.

6. The data store system of claim 1, wherein the processor is further configured to:
    store the resultant set of rows in a table in the storage device; and
    delete the resultant set of rows after a predetermined period of time.

7. A method comprising:
    receiving, with a processor, data from a source;
    generating, with the processor, a plurality of rows from the data;
    buffering the plurality of rows;
    applying, with the processor, row reduction criteria to the buffered plurality of rows, wherein the row reduction criteria comprises at least one condition associated with content of the buffered plurality of rows;
    in response to application of the row reduction criteria, determining, with the processor, at least one resultant row based on presence of the at least one condition, wherein a number of the at least one resultant row is less than a number of the buffered plurality of rows, and the at least one resultant row is configured to reconstruct the plurality of rows; and
    storing, with the processor, the at least one resultant row in the storage device.

8. The method of claim 7, wherein the row reduction criteria comprises determination of a plurality of time derivative values, wherein each time derivative value is based on adjacent column values of at least one column of the buffered plurality of rows, wherein the method further comprises:

identifying a subset of the buffered plurality of rows, wherein the subset of the buffered plurality of rows are associated with a time derivative value below a predetermined value; and selecting a first and last row of the subset of the buffered plurality of rows to be included in the at least one resultant row, wherein other rows of the subset of the buffered plurality of rows are not included in the at least one resultant row.

9. The method of claim 7, wherein the row reduction criteria comprises aggregation of row values in at least one column over a predetermined time window, wherein the method further comprises aggregating, with the processor, rows values of the at least one column in the buffered plurality of rows to create at least one new row.

10. The method of claim 7, wherein the row reduction criteria is application of a user-defined function.

11. The method of claim of claim 7, wherein the row reduction criteria is a value profile, wherein the method further comprises identifying, with the processor, a value profile of consecutive values in at least one column of the buffered plurality of rows.

12. The method of claim 7, wherein the method further comprises:

storing, with the processor, the resultant set of rows in a table in a storage device; and deleting, with the processor, the resultant set of rows after a predetermined period of time.

13. A non-transitory computer-readable medium encoded with a plurality of instructions executable by a processor, the plurality of instructions comprising:

instructions to receive data from a source;

instructions to generate a plurality of rows from the data;

instructions to buffer the plurality of rows;

instructions to apply row reduction criteria to the buffered plurality of rows wherein the row reduction criteria comprises at least one condition associated with content of the buffered plurality of rows;

instructions to, in response to application of the row reduction criteria, determine at least one resultant row based on presence of the at least one condition, wherein a number of the at least one resultant row is less than a number of the buffered plurality of rows, and the at least one resultant row is configured to reconstruct the plurality of rows; and instructions to store the at least one resultant row in the storage device.

14. The non-transitory computer-readable medium of claim 13, wherein the row reduction criteria comprises determination of a plurality of time derivative values, wherein each time derivative value is based on adjacent column values of at least one column of the buffered plurality of rows, wherein the plurality of instructions further comprises:

instructions to identify a subset of the buffered plurality of rows, wherein the subset of the buffered plurality of rows are associated with a time derivative value below a predetermined value; and instructions to select a first and last row of the subset of the buffered plurality of rows to be included in the at least one resultant row, wherein other rows of the subset of the buffered plurality of rows are not included in the at least one resultant row.

15. The non-transitory computer-readable medium of claim 13, wherein the row reduction criteria comprises aggregation of row values in at least one column over a predetermined time window, wherein the plurality of instructions further comprises instructions to aggregate rows values of the at least one column in the buffered plurality of rows to create at least one new row.

16. The non-transitory computer-readable medium of claim 13, wherein the row reduction criteria is application of a user-defined function.

17. The non-transitory computer-readable medium of claim 13, wherein the row reduction criteria is a value profile, wherein the plurality of instructions further comprises instructions to identify a value profile of consecutive values in at least one column of the buffered plurality of rows.

18. The non-transitory computer-readable medium of claim 13, wherein the plurality of instructions further comprises:

instructions to store the resultant set of rows in a table in a storage device; and instructions to delete the resultant set of rows after a predetermined period of time.

\* \* \* \* \*